US012301623B2

(12) United States Patent
Schneider et al.

(10) Patent No.: US 12,301,623 B2
(45) Date of Patent: May 13, 2025

(54) DYNAMICALLY HARDENING COMMUNICATIONS HAVING INSECURE PROTOCOLS

(71) Applicant: NVIDIA Corporation, Santa Clara, CA (US)

(72) Inventors: Christopher Schneider, Fife (GB); Amy Rose, Chapel Hill, NC (US); Benjemin Thomas Waine, Cheshunt (GB); Andrew James Woodard, Buckinghamshire (GB)

(73) Assignee: NVIDIA Corporation, Santa Clara, CA (US)

( * ) Notice: Subject to any disclaimer, the term of this patent is extended or adjusted under 35 U.S.C. 154(b) by 433 days.

(21) Appl. No.: 17/096,675

(22) Filed: Nov. 12, 2020

(65) Prior Publication Data

US 2022/0006836 A1 Jan. 6, 2022

Related U.S. Application Data

(60) Provisional application No. 63/047,122, filed on Jul. 1, 2020.

(51) Int. Cl.
*H04L 29/00* (2006.01)
*H04L 9/40* (2022.01)
*H04L 69/18* (2022.01)

(52) U.S. Cl.
CPC ........ *H04L 63/166* (2013.01); *H04L 63/0272* (2013.01); *H04L 63/0876* (2013.01); *H04L 63/20* (2013.01); *H04L 69/18* (2013.01)

(58) Field of Classification Search
CPC ............... H04L 63/166; H04L 63/0272; H04L 63/0876; H04L 63/20; H04L 69/18; H04L 69/08

See application file for complete search history.

(56) References Cited

U.S. PATENT DOCUMENTS

2003/0182451 A1* 9/2003 Grass .................... H04L 65/765
709/246
2004/0097188 A1* 5/2004 Tanimoto ............ H04L 65/1069
455/3.06

(Continued)

FOREIGN PATENT DOCUMENTS

WO WO-2014164976 A1 * 10/2014 ............. G05B 13/04

OTHER PUBLICATIONS

"Upgrade SNMP v1/v2 equipment to SNMPv3 for added security," DPS Telecom, Retrieved from the internet on Apr. 14, 2020 from URL <https://www.dpstele.com/snmp/convert-upgrade-version-snmpv3.php>.

*Primary Examiner* — Jeffrey C Pwu
*Assistant Examiner* — Helai Salehi
(74) *Attorney, Agent, or Firm* — Taylor English Duma L.L.P.

(57) ABSTRACT

In various examples, communications having insecure protocols are dynamically hardened. For example, communications that are formatted in an outdated or otherwise insecure version of a protocol (e.g., sent by a device aged out of a service window) may be isolated within a network, converted to an updated protocol format, or any combination thereof. These systems and methods may be implemented on a general purpose network device (e.g., a hub of a Local Area Network (LAN)).

20 Claims, 6 Drawing Sheets

(56) References Cited

U.S. PATENT DOCUMENTS

| | | | |
|---|---|---|---|
| 2008/0126559 A1* | 5/2008 | Elzur | H04L 69/08 709/232 |
| 2008/0172745 A1* | 7/2008 | Reinart | G06F 21/6209 726/26 |
| 2014/0189343 A1* | 7/2014 | Heit | H04L 63/0471 713/153 |
| 2015/0067188 A1* | 3/2015 | Chakhaiyar | H04L 69/08 709/232 |

* cited by examiner

DYNAMICALLY HARDENING
COMMUNICATIONS HAVING INSECURE
PROTOCOLS

CROSS REFERENCE TO RELATED
APPLICATIONS

This application claims priority to U.S. Provisional Application No. 63/047,122 (filed Jul. 1, 2020), which is incorporated herein by reference in its entirety.

BACKGROUND

Networks are widespread in today's society and can connect a wide array of devices and/or systems (e.g., computers, appliances, home automation devices, security systems, vehicles, etc.) using various communication protocols. For example, Internet of Things (IoT) devices are becoming commonplace within home and office environments. As technology ages, the support of older products may be dropped for various reasons, such as a shift in focus to newer models and/or platforms. Products that no longer receive updates, and thus fail to update to newer communication protocols and/or versions thereof, can represent attack vectors and pose problems within networking ecosystems. In many instances, these products that are no longer supported can still perform valuable operations (e.g., open garage door, adjust thermostat, etc.). As such, some users may continue to use and rely on these products, even though they pose a security threat. Alternatively, a company could choose to "brick" or otherwise disable these devices by rendering them essentially inoperable, but this risks alienating customers and wastes otherwise functional equipment.

Conventionally, a Simple Network Management Protocol (SNMP) mediator device may be positioned at a site having SNMP devices sending communications formatted in SNMP v1 or v2 (e.g., physically positioned at the building where the SNMP devices are located). The SNMP mediator device receives the SNMP v1 or v2 communications from the SNMP devices and converts them to SNMP v3 before sending on to a downstream SNMP device (e.g., an SNMP v3 Manager). However, this SNMP-specific approach requires specialized equipment (i.e., the SNMP mediator device) that has limited functionality by only servicing a single protocol and only converting between specific and predetermined versions of the protocol. Furthermore, this approach is limited to a single method of updating a protocol, which may not be appropriate for other protocols.

SUMMARY

Embodiments of the present disclosure relate to dynamically hardening communications having insecure protocols. Systems and methods are disclosed that harden insecure communications that are formatted in an outdated or otherwise insecure version of a protocol (e.g., sent by a device aged out of a service window). More specifically, the present disclosure relates to solutions that could be implemented on a network device (e.g., a hub of a Local Area Network (LAN)) in order to harden insecure communications (e.g., by encapsulating a communication in an updated protocol wrapper and/or translating the communication to a current or more secure protocol or version of the protocol) before sending on to a destination device (e.g., another client or server on the same LAN or outside of the LAN).

In contrast to conventional systems, such as those described above, the present disclosure provides, in part, solutions that may be implemented on a general-purpose network device (e.g., a hub or combo network device in a residence, vehicle, business, etc.), or other centralized network hub, as opposed to special-use equipment used in conventional approaches. The network device may receive, isolate, and harden communications in various different communication protocol formats using a variety of techniques, in contrast to merely converting between limited predetermined versions of a protocol.

BRIEF DESCRIPTION OF THE DRAWINGS

The present systems and methods for dynamically hardening communications having insecure protocols are described in detail below with reference to the attached drawing figures, wherein.

DETAILED DESCRIPTION

Figure 1:
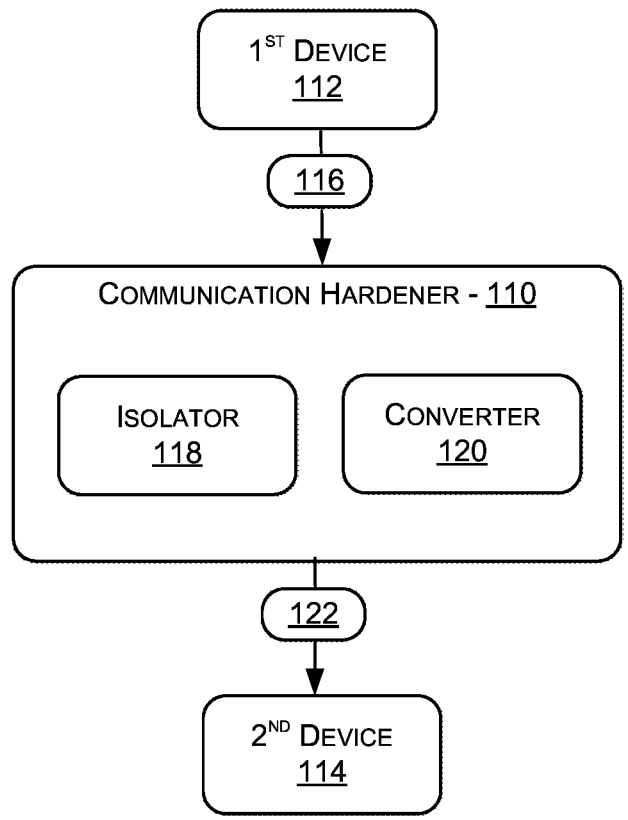
FIG. 1 is an illustration of a communication hardener communicating with a first device and second device, in accordance with some embodiments of the present disclosure.

Systems and methods are disclosed related to dynamically hardening communications having insecure protocols. The disclosure provides, in part, solutions that may be implemented on a general-purpose network device (e.g., a hub or combo network device in a residence, vehicle, business, etc.), or other centralized network hub, as opposed to special-use equipment used in conventional approaches. The network device may receive, isolate, and harden communications in various different communication protocol formats using a variety of techniques, in contrast to merely converting between particular predetermined versions of a protocol.

In various embodiments, when a communication is received, the network device may examine the communication to determine its communication protocol format, and compare that format (e.g., an identifier (ID) of the format extracted from the communication) to a listing of communication protocol formats in one or more data stores. If the communication protocol format is in that listing, the network device may implement one or more remedial measures. For example, the network device may convert the communication to, or wrap the communication with, a different communication protocol format (e.g., a newer version of the same protocol, a format of a different protocol, a format of a current version of a protocol) and transmit the converted message to the original destination.

In some embodiments, the other communication protocol format may be associated with the listing for the communication protocol format in the one or more data stores and/or otherwise determined for the communication (e.g., based on a destination ID in or associated with the communication, based on a device ID of the sending device, based on the protocol that the communication protocol format belongs to, based on the interface over which the communication was received, etc.). The network hub may, in some embodiments, determine and/or access conversion rules based on the initial communication protocol format and/or the desired communication protocol format, and use the conversion rules to map, convert, and/or process fields and/or field values between the formats, and/or otherwise reconstruct the communication in the desired communication protocol format. Additionally or alternatively, the communications rules may direct wrapping data of the communication formatted in the initial communication protocol format with a wrapper of the desired communication protocol format.

In various examples, in addition to, or alternatively from, converting the communication to a different communication protocol format, the network device may configure one or more security rules for the sending device (also referred to as client device), for example, in the form of one or more Access Control Lists (ACLs). For example, the network device may assign at least one communications channel of the client device to an isolated network, which may include a network segmented in the internal network through a Virtual Local Area Network (VLAN) or separate subnet (e.g., subnet of a Local Area Network (LAN)) or network. The isolated network may also include a Virtual Private Network (VPN) or a micro-VPN.

The at least one communications channel assigned to the client device may be associated with the client device in various respects, such as used to transmit a communication sent from (or addressed to) the client device. For instance, a communications channel of the client device may include a communications channel between the client device and a network device (e.g., internal router) and/or a communications channel between the network device and a destination device (e.g., external server on the Internet, second client on the private network, etc.). The network device may send (e.g., forward) the communication to the destination over the at least one communications channel.

Assigning the security rules to the sending device may act to isolate communications to and/or from the client device that are sent and/or received over the communications channel(s). For example, the network device may assign one or more network interfaces of the client device to the isolated network, such as a computer port, a port, a socket, and/or other interface to and/or from the device. In at least one embodiment, the client device may be assigned to a VLAN that is separate from each other client device on the LAN managed by the network device and/or the client device may be assigned to a VPN used to send communications to an external server. Using the isolated network, the other client devices may be protected from the client device, which may be vulnerable to attacks due to potentially outdated software.

In various examples, security rules may be associated with a client device using a device ID, such as a MAC address. When future communications are received by the network device, the network device may process the communications in accordance with the security rules, such as based at least on associating the communications with the device ID (e.g., extracted from a communication or otherwise based on the communication). For example, the network device may process the communication as directed by the security rules based at least on a communication being associated with the device ID and/or other conditions related to the communication (e.g., the interface, destination ID, etc.). In various examples, processing the communication may include assigning or otherwise associating the communication with a new or existing VPN. Further, where the communication is in an insecure communication protocol format, the network device may convert the communication prior to forwarding to its destination (e.g., as directed by the assigned security rules and/or based on whether the communication protocol format is in the listing in the one or more data stores).

With reference to FIG. 1, FIG. 1 illustrates an example of a communications hardener 110 transmitting one or more communications between a first device 112 and a second device 114, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In FIG. 1 the first device 112 may include a device programmed to send and receive communications in an insecure protocol. For example, software running on the first device 112 may include an outdated communications protocol. The first device 112 may be one of a variety of different computing devices that participate in an Internet of Things (IoT) system or other network to send and receive communications, such as in a "Smart Home" system or other network in which devices talk or communication with one another. Examples of devices include appliances, doors, thermostats, security systems, curtains, and the like. Examples of other devices include, by way of example and not limitation, a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The communications hardener 110, the first device 112, and the second device 114 may belong to, and send communications using, one or more various networks, such as a Personal Area Network (PAN), Local Area Network (LAN), Virtual LAN (VLAN), Wireless LAN (WLAN), Campus Area Network (CAN), Metro Area Network (MAN), wide area network (WAN), etc. The communications hardener 110 may be a component of a network device (e.g., hub, repeater, bridge, switch, router, gateway, bridge router ("brouter"), etc.). The first device 112 may leverage one or more networks to send a communication 116 that is addressed to the second device 114, that is routed through the network device and the communications hardener 110, and that is formatted in an insecure communications protocol, such as an older version of a protocol. In accordance with an aspect of the present disclosure, upon receipt of the communication 116, the communications hardener 110 may take one or more remedial measures to harden the communication 116.

In a further aspect, the communication hardener 110 includes a communication isolator 118 and a communication converter 120 that may be used to perform one or more remedial measures for hardening the communication 116. For example, the communication isolator 118 may isolate the communication 116, as well as subsequent communications received from or addressed to the first device 112 programmed to send and receive communications in an insecure protocol. In another aspect, the communication converter 120 may convert the communication 116 to an updated communication 122, which is then sent to the second device 114. For example, the communication converter 120 may convert the communication 116 having an outdated protocol to a newer version of the protocol or may apply an updated-protocol wrapper to the communication 116.

The communication isolator 118 and the communication converter 120 may be used independently of one another, or in combination, to perform the one or more remedial measures. For example, in some instances, the one or more remedial measures may include isolating the communication(s) without converting, or vice versa. Alternatively, the one or more remedial measures may include both isolating and converting. As such, the present disclosure provides a solution that may be implemented on a general-purpose network device (e.g., hub or combo network device in a residence, vehicle, business, etc.), or other centralized network hub, and that receives, isolates, and hardens communications formatted in various different unsecured protocols, in contrast to conventional methods limited to using special-use equipment for updating a single type of protocol.

Figure 2:
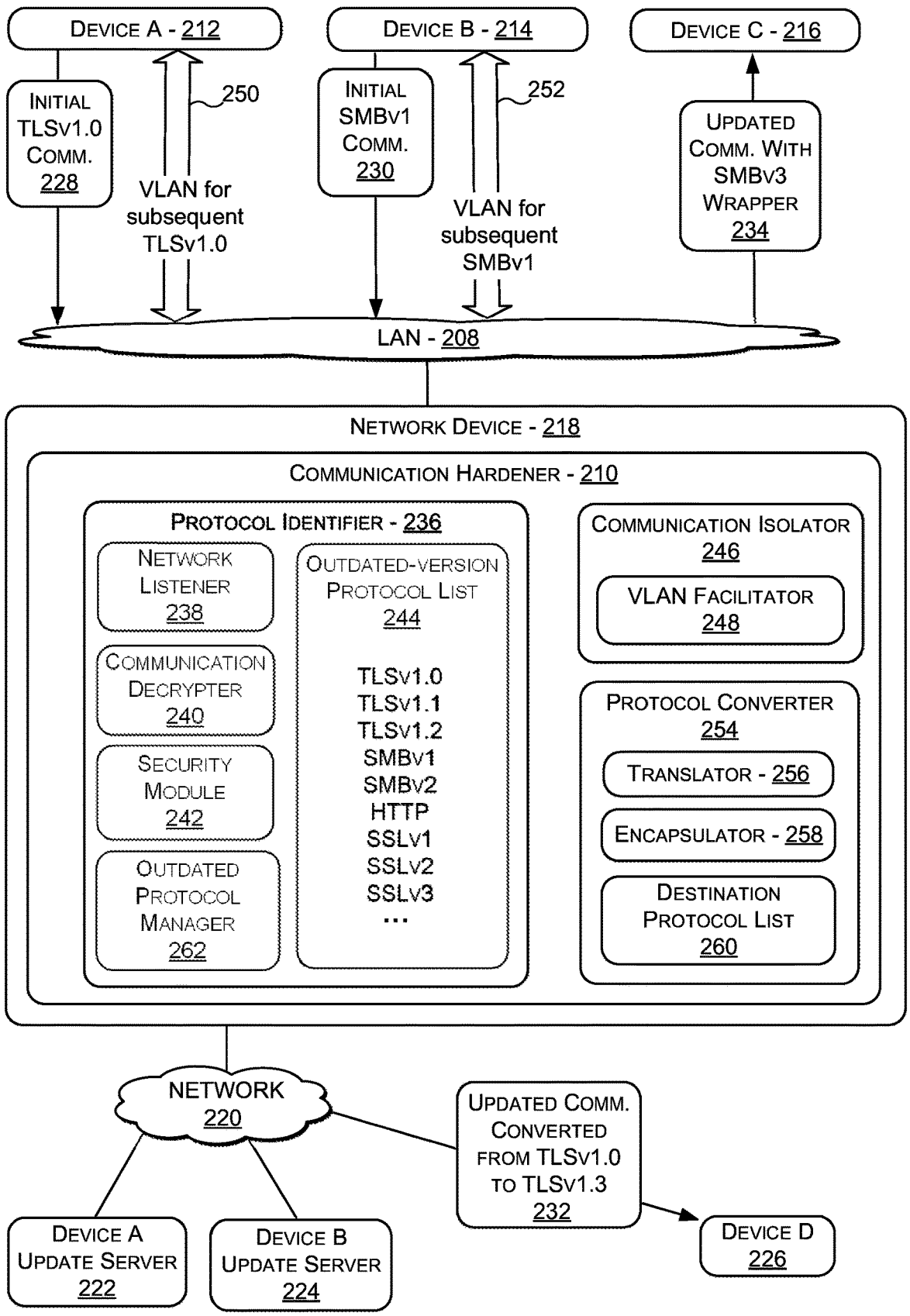
FIG. 2 is an illustration showing an example network, in accordance with some embodiments of the present disclosure.

Referring now to FIG. 2, an example computing environment is depicted, in accordance with an aspect of the present disclosure. The computing environment depicted in FIG. 2 may include at least some similar elements to those described with respect to FIG. 1. FIG. 2 includes a local area network (LAN) 208 connecting a device A 212, a device B 214, a device C 216, and a network device 218 (e.g., hub, repeater, bridge, switch, router, gateway, brouter, etc.). In addition, the network device 218 is connected to another network 220 (e.g., the Internet). FIG. 2 also includes a device A update server 222 that provides updates (e.g., via the network device 218) to device A 212; a device B update server 224 that provides updates to the device B 214; and a device D 226 (e.g., a server or client external to the LAN 208) that may communicate with device A 212, the device B 214, and/or the device C 216.

Similar to the first device 112 of FIG. 1, the device A 212 and/or the device B 214 may include a variety of different types of computing devices. For example, the device A 212 and the device B 214 may include devices that are part of an IoT system, smart home or other smart building, or other network, or a variety of other types of client devices. For various reasons, the device A 212 and the device B 214 may include software that does not use the most recent version of a communications protocol. For example, if the device A 212 and the device B 214 fail to receive updates from the device A update server 222 and the device B update server 224, respectively (e.g., the device A 212 and the device B 214 age outside of a support window), then the device A 212 and the device B 214 may be programmed to communicate using outdated protocols. In that case, the device A 212 and the device B 214 may try to communicate with other devices (e.g., the device C 216 and the device D 226), using communications (e.g., "at-risk communications") formatted in outdated protocols and at risk for security issues. For example, in FIG. 2 the device A 212 is sending an at-risk communication 228 formatted in TLSv1.0, and the device B 214 is sending an at-risk communication 230 formatted in SMBv1.

The present innovation, in contrast to conventional approaches that update only a single type of protocol, may isolate and update the at-risk communication 228 from the device A 212 formatted in TLSv1.0, the at-risk communication 230 from the device B 214 formatted in SMBv1, and other at-risk communications formatted in other protocols (e.g., SSL, HTTP, etc.). For example, FIG. 2 includes an updated communication 232 converted from TLSv1.0 to TLSv1.3 being sent to the device D 226 (e.g., via the network 220)—e.g., the updated communication 232 includes the data of the initial at-risk communication 228 from the device A 212 translated from TLSv1.0 into TLSv1.3. In addition, FIG. 2 depicts an updated communication 234 being sent to the device C 216—e.g., updated communication 234 to the device C 216 includes the data of the at-risk communication 230 from the device B 214 in a SMBv3 wrapper. By providing a software solution that can be implemented on a general-purpose, centralized network device, separate devices programmed for a single protocol type are not required, which may be more efficient and may reduce costs associated with the network (e.g., capital expenditures, maintenance costs, etc.).

The present solution may operate in various manners. In one aspect, the network device 218 includes a communication hardener 210 programmed to identify communications having outdated versions of protocols, isolate the communications, and update the communications. These operations may be computationally intensive (e.g., by processing on a packet-by-packet basis), and as such, in some instances the software may leverage a graphical processing unit (e.g., GPU) of the network device (e.g., the GPU(s) 608 of FIG. 6), which may have greater processing capabilities than other types of processing units.

In FIG. 2, the communication hardener 210 includes a protocol identifier 236 to identify when a communication received by the network device 218 includes an outdated protocol. For example, the protocol identifier 236 may include a network listener 238 that may receive communications (e.g., the initial communications from the Device 1 and the Device 2). In some instances, if the communication is encrypted, then the communication may be passed to a communication decrypter 240 to decrypt the content, such as by communicating with the sending device to obtain decryption information (e.g., password, key, etc.) and/or accessing or retrieving the decryption information from local storage (e.g., a repository of multiple sets of decryption information). If the communication is not encrypted, then the communication decrypter 240 may be bypassed or otherwise not used.

Once the communication is not encrypted, a security module 242 may determine whether the communication is formatted in an outdated protocol. The protocol in which a communication is formatted may be listed in the header (or other portion) of the communication, which may be inspected by the security module 242 upon receipt. The security module 242 may include (or reference in a data store) security rules such as a set of ACLs listing instructions for handling communications formatted in an outdated protocol. In some instances, the identifier of the outdated protocol (e.g., TLSv1.0, SMBv1, etc.) may be listed directly in the security rules or it may be listed in a discrete table 244 referenced by the security rules. Alternatively, if the security rules do not specify that the protocol version and/or protocol (e.g., most current protocol version) should be routed to the hardening software, then the communication may proceed without being further processed by the protocol identifier 236. In some examples, rather than outdated or insecure protocols and/or versions thereof, the list may include permitted and/or secure protocols and/or versions thereof, and outdated or insecure protocols may be identified based on not being included in the list.

Security rules may specify various actions based on an identified protocol (e.g., a particular identified protocol and/or version thereof). In one aspect, forwarding rules specify that, when a communication is formatted in an identified protocol version (e.g., outdated protocol), the communication is isolated (e.g., using a virtual private network (VPN), microVPN, virtual LAN (VLAN), other subnetwork of the LAN 208, or any combination thereof). Isolation may be achieved using various approaches, and may apply to the communication, as well as future communications received from and/or addressed to the device that sent the communication.

In one aspect of the disclosure, the communication is isolated by being routed to a different processing space of the network device 218 for handling by different network controls. For example, a microVPN channel may be opened, permitting the communication formatted in the outdated protocol to be forwarded to a different processing space for processing separate from other network traffic. As such, the present disclosure provides another layer of security by isolating (within the network device 218) the communication formatted in the outdated protocol.

In other aspects of the disclosure, once a communication having an outdated protocol is identified, future communications to and/or from the outdated devices (e.g., Device 1 and Device 2) may be isolated to a sub-network (e.g., VLAN) separate from other network traffic. For example, as depicted in FIG. 2, the communication hardener 210 may include a communication isolator 246 having a virtual LAN (VLAN) facilitator 248 that may manage future communications. Using the VLAN facilitator 248, a separate communication channel may be assigned between the sender device and the destination device, in accordance with an aspect of the disclosure. For instance, FIG. 2 illustrates a VLAN 250 associated with the device A 212 and another VLAN 252 associated with the device B 214. In this manner, the future at-risk communications with the outdated devices may also be isolated from other network traffic. In some instances, the VLAN may be managed in the separate processing space (e.g., via a microVPN).

In additional aspects, once a communication having an outdated protocol is identified, the system of the present disclosure may update the at-risk communication (e.g., communications 228 and 230). For example, the communications hardener 210 may include a protocol converter 254 having a translator 256 and/or an encapsulator 258. In one aspect of the present disclosure, converting may include mapping fields of the communication in the first communication protocol format (e.g., the outdated format) to fields of the communication in a second communication protocol format (e.g., the updated format). The translator 256 may receive an at-risk communication formatted in an outdated protocol and translate the data of the communication to an updated version of the protocol. For example, the updated communication 232 being transmitted to the device D 226 includes the data (e.g., of the communication 228) previously formatted in TLSv1.0 now formatted in TLSv1.3. The translator may be configured to also translate from a secure protocol to an unsecure protocol. For example, if the device D 226 sends a response communication back to the device A 212, and the response communication is in TLSv1.3, then the translator 256 may translate the data of the response communication to TLSv1.0 before sending to the device A 212 (e.g., on the VLAN 250) as the device A 212 may not be capable of interpreting the TLSv1.3 communication.

In other aspects of the disclosure, instead of translating the outdated protocol, the encapsulator 258 may harden an at-risk communication by wrapping data formatted in an outdated protocol with an updated-protocol wrapper. For example, the updated communication 234 being transmitted to the device C 216 includes a SMBv3 wrapper encapsulating the data of the communication 230 sent from the device B 214 formatted in SMBv1. The protocol converter 254 is depicted in FIG. 2 as including both the translator 256 and the encapsulator 258, and in some embodiments, the protocol converter 254 may include both components. In other aspects, the protocol converter 254 may include one of the translator 256 or the encapsulator 258.

Once a communication has been converted to an updated communication protocol format, the communication may then be transmitted by the network device 218 to a destination device, such as a device internal or external to the LAN 208. In some instances, the communication may be encrypted by the network device 218 prior to transmittal to the destination device.

The present disclosure may include other features as well. For example, the protocol converter 254 may include a destination protocol list 260 that logs or tracks what versions are receivable by destination devices. For example, an updated communication (e.g., translated to updated protocol or wrapped in updated protocol) might be sent to a destination device, and if the communication is received (e.g., a responsive communication from the destination device is received indicating as much), then an identifier (ID) of the destination device (e.g., MAC address) may be stored together with the version ID of the updated protocol in the destination protocol list 260. If the updated communication is not received by the destination device (e.g., bounced back), then the protocol converter 254 may reconvert the communication using an older version of the protocol (but newer than the original at-risk communication) and resend the reconverted communication. The protocol converter 254 may iteratively reconvert the communication with successively older protocols until the communication is received, at which point the destination device ID may be stored with the protocol version ID that was received. Using the destination protocol list 260, the protocol converter 254 may determine an appropriate protocol version for a destination device to which a communication has been previously sent. For example, upon receiving a communication routed from the protocol identifier 236, the protocol converter 254 may pull the Destination Device ID from the header and lookup the Destination Device ID in the destination protocol list 260 to determine the appropriate protocol version.

In another aspect of the present disclosure, the protocol identifier 236 includes an outdated protocol manager 262 that receives updates based on new protocol versions and pushes them out to the other components. For example, the outdated protocol manager 262 may receive (e.g., over the network 220 and/or via a firmware or other update) software updates to add protocol versions to the security rules (e.g., ACLs, outdated-version protocol list 244, etc.). In addition, the outdated protocol manager 262 may receive translation updates and encapsulation updates that harden communications with new protocol versions and that are pushed to the translator 256 and the encapsulator 258.

Figure 3:
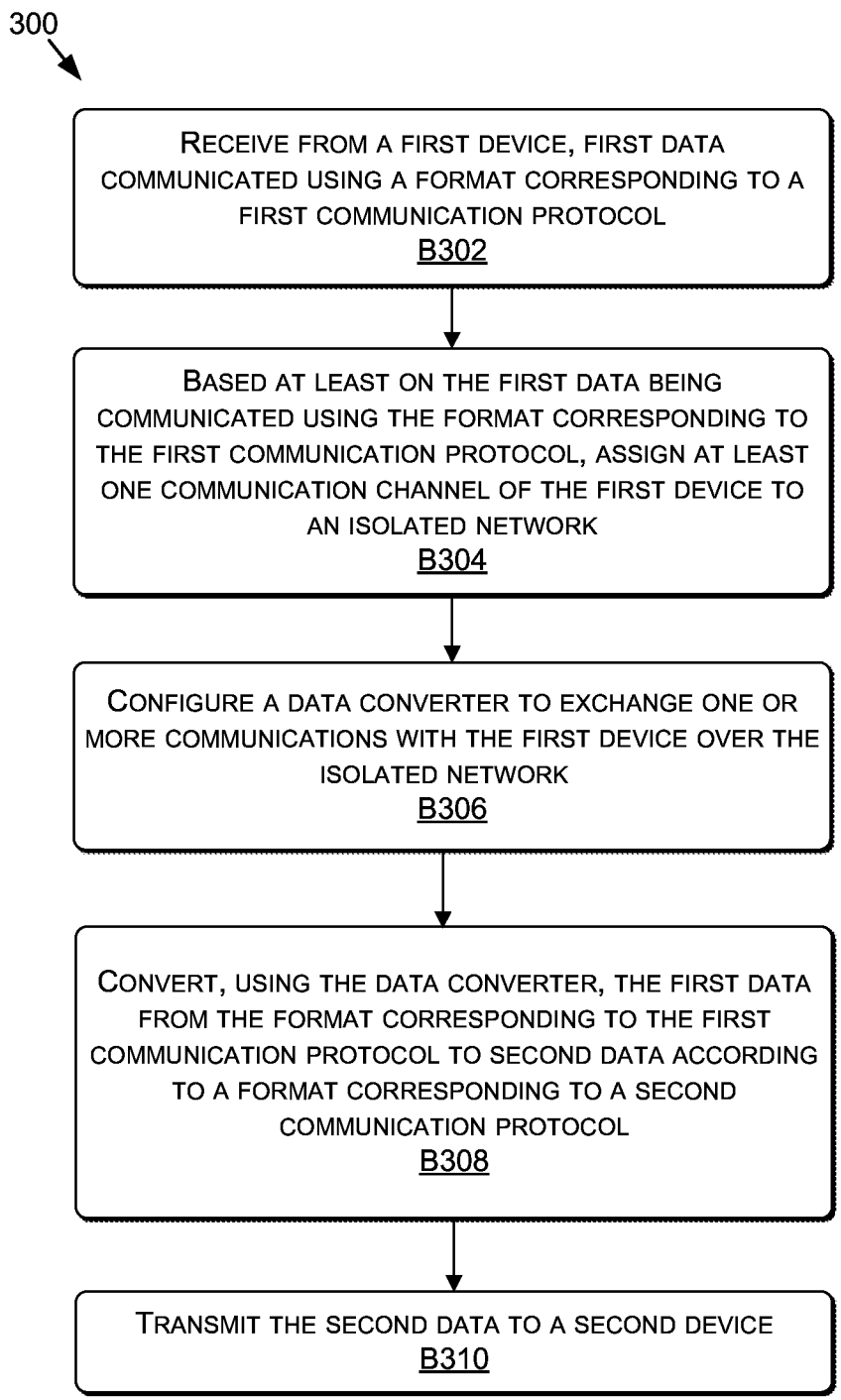
FIG. 3 depicts a flow diagram showing a method for hardening a network by isolating a communication channel and converting a communication protocol format, in accordance with some embodiments of the present disclosure.
Figure 4:
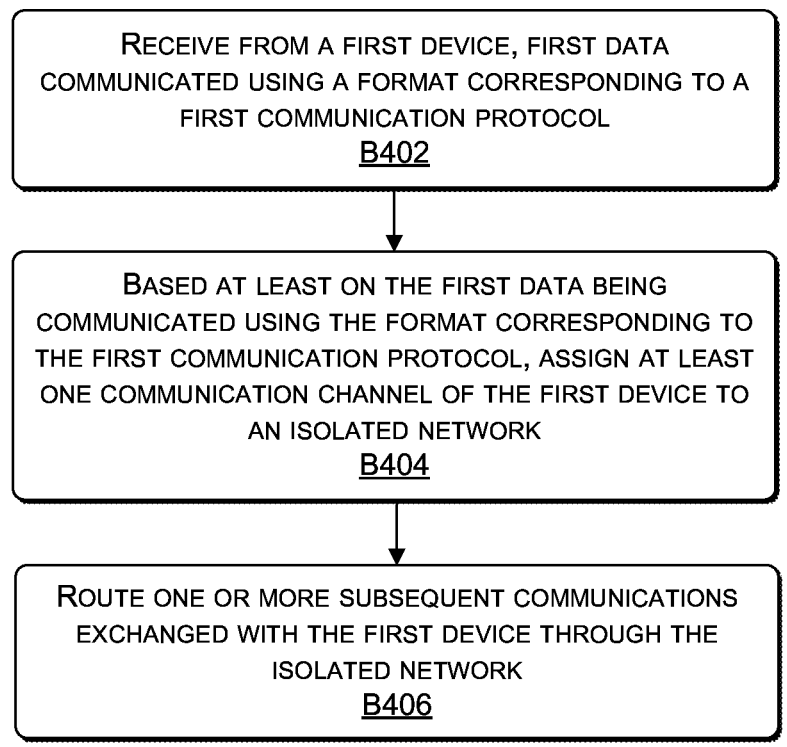
FIG. 4 depicts a flow diagram showing a method for hardening a network by isolating traffic to/from a device, in accordance with some embodiments of the present disclosure.
Figure 5:
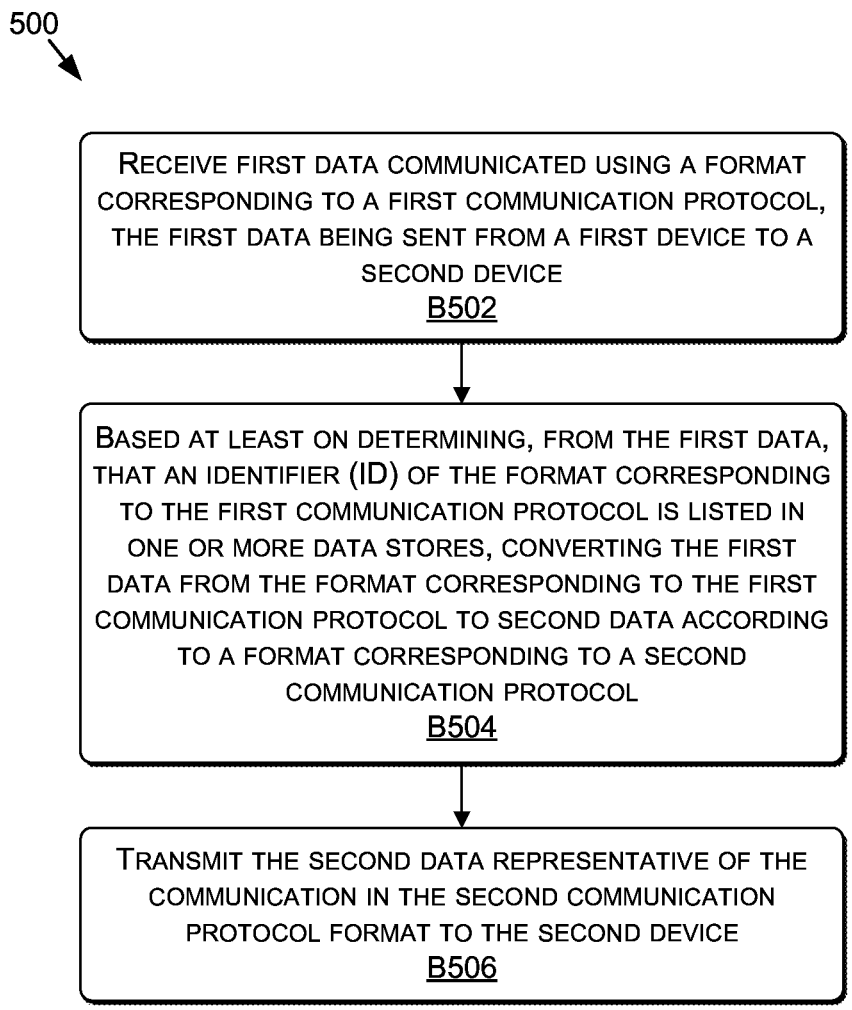
FIG. 5 depicts a flow diagram showing a method for hardening a network by converting a communication protocol format when the format is included in a listing, in accordance with some embodiments of the present disclosure.

Now referring to FIGS. 3-5, each block of methods 300, 400, and 500 described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, methods 300, 400, and 500 are described, by way of example, with respect to the system(s) of FIGS. 1 and 2. However, these methods may additionally or alternatively be executed by any one system, or any combination of systems, including, but not limited to, those described herein.

FIG. 3 is a flow diagram showing a method 300 for hardening a communication in accordance with some embodiments of the present disclosure. The method 300, at block B302, includes receiving, from a first device, first data communicated using a format corresponding to a first communication protocol. For example, in FIG. 1 the communication hardener 110 may receive the communication 116. In another example provided by FIG. 2, the protocol identifier 236 may receive the communication 228 from the device A 212 and/or the communication 230 from the device B 214.

The method 300, at block B304 includes, based at least on the first data being communicated using the format corresponding to the first communication protocol, assigning at least one communication channel of the first device to an isolated network. For example, the communication channel of the first device may be any communication channel associated with the first device or otherwise used to transmit a communication sent by (or addressed to) the first device. In this respect, the communication channel may be a communication channel between the first device and a network device that received the first data, a communication channel between the network device and a destination device (e.g., identified in the first data), or any combination thereof. For instance, in FIG. 1 the communication hardener 110 includes the isolator 118 that may isolate communications associated with the first device that might present a security risk based on the outdated protocol. As a further example in FIG. 2, based on the security module 242 following an ACL or other security rules (e.g., referencing the outdated-version protocol list 244), a microVPN, a VLAN, a subnet, or a combination thereof, may be assigned as a communication channel of the device A 212 and/or the device B 214.

The method 300, at block B306 includes, configuring a data converter to exchange one or more communications with the first device over the isolated network. For example, in FIG. 1, the communication hardener 110 includes the converter 120 that may be configured (e.g., using security rules) to exchange communications with the first device 112. In another example illustrated in FIG. 2, the protocol converter 254 may be configured (e.g., using security rules in the security module 242) to exchange communications with the device A 212 and/or the device B 214.

The method 300, at block B308 includes, converting, using the data converter, the first data from the format corresponding to the first communication protocol to second data according to a format corresponding to a second communication protocol. For example, in FIG. 1 the communication hardener 110 includes the converter 120 that may receive the first data and apply various operations to convert the first data. In another example provided by FIG. 2, the protocol converter 254 includes the translator 256 and/or the encapsulator 258. Using the translator, the first data formatted in a first protocol may be translated to the second data formatted in a second protocol. Alternatively, or additionally, the first data in the first protocol may be encapsulated in a wrapper of the second protocol format.

The method 300, at block B310 includes, transmitting the second data to a second device. For example, in FIG. 1 the communication hardener 110 may transmit the communication 122 to the second Device 114. In another example provided by FIG. 2, the communication 232 (e.g., updated version of the communication 228) may be transmitted to the device D 226 and/or the communication 234 (e.g., updated version of the communication 230) may be transmitted to the device C 216.

FIG. 4 is a flow diagram showing a method 400 for hardening a communication in accordance with some embodiments of the present disclosure. The method 400, at block B402 includes, receiving, from a first device, first data communicated using a format corresponding to a first communication protocol. For example, in FIG. 1 the communication hardener 110 may receive the communication 116. In another example provided by FIG. 2, the protocol identifier 236 may receive the communication 228 from the device A 212 and/or the protocol identifier 236 may receive the communication 230 from the device B 214.

The method 400, at block B404 includes, based at least on the first data being communicated using the format corresponding to the first communication protocol, assigning at least one communication channel of the first device to an isolated network. For example, the communication channel of the first device may be any communication channel associated with the first device or otherwise used to transmit a communication sent by (or addressed to) the first device. In this respect, the communication channel may be a communication channel between the first device and a network device that received the first data, a communication channel between the network device and a destination device (e.g., identified in the first data), or any combination thereof. For instance, in FIG. 1 the communication hardener 110 includes the isolator 118 that may isolate communications associated with the first device 112 that might present a security risk based on the outdated protocol. As a further example in FIG. 2, based on the security module 242 following an ACL or other security rules (e.g., referencing the outdated-version protocol list 244), a microVPN, a VLAN, a subnet, or a combination thereof, may be assigned as a communication channel of the device A 212 and/or the device B 214.

The method 400, at block B406 includes, routing at least one second data exchanged with the first device through the isolated network. For example, in FIG. 2, the VLANs 250 and 252 have been created to exchange subsequent communications with the device A 212 and the device B 214 (respectively). As such, if the network device 218 receives a communication addressed to the device A 212 or the device B 214, the communication may be converted to an outdated protocol format and transmitted to the device A 212 or the device B 214 through the respective VLAN. In this manner, communications with outdated protocol formats may be isolated from other traffic of the LAN 208.

FIG. 5 is a flow diagram showing a method 500 for hardening a communication in accordance with some embodiments of the present disclosure. The method 500, at block B502 includes, receiving first data communicated using a format corresponding to a first communication protocol, the first data being sent from a first device to a second device. For example, in FIG. 1 the communication hardener 110 may receive the communication 116 being sent from the first device 112 to the second device 114. In another example provided by FIG. 2, the protocol identifier 236 may receive the communication 228 (e.g., in TLSv1.0) from the device A 212 and/or the protocol identifier 236 may receive the communication 230 (e.g., in SMBv1) from the device B 214. In the embodiment depicted by FIG. 2, the communication 228 is being sent from the device A 212 to the device D 226, and the communication 230 is being sent from the device B 214 to the device C 216.

The method 500, at block B504 includes, based at least on determining, from the first data, that an identifier (ID) of the format corresponding to the first communication protocol is listed in one or more data stores, converting the first data from the format corresponding to the first communication protocol to second data according to a format corresponding to a second communication protocol. For example, the security module 242 may reference a protocol ID in a header of the received communication and apply an ACL or security rule, which may include searching the outdated-version protocol list 244 to determine the protocol ID is listed. Upon determining the protocol ID is listed, the communication may be forwarded to the protocol converter 254 to be converted to the second communication protocol format (e.g., either translated or encapsulated).

The method 500, at block B506 includes, transmitting the second data representative of the communication in the second communication protocol format to the second device. For example, in FIG. 1 the communication 122 may be transmitted to the second device 122 after operations of the converter 120 are executed. In other examples provided by FIG. 2, the communication 232 (having been translated) may be transmitted to the device D 226, and/or the communication 234 (having been encapsulated) may be transmitted to the device C 216.

Figure 6:
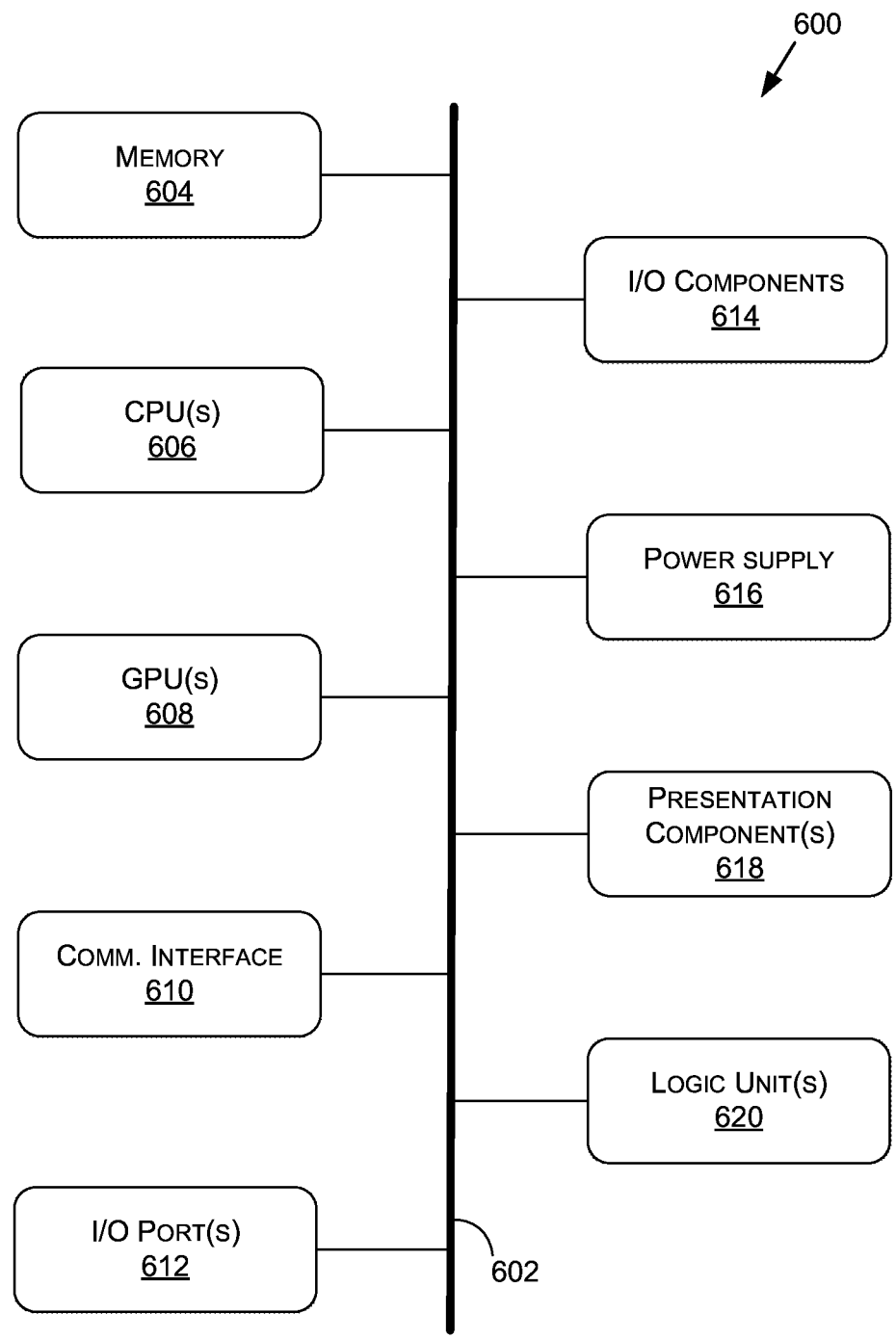
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. For example, the network device 218 may include the computing device 600, or components of the computing device 600. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions that represent a program(s) and/or a program element(s), such as an operating system. Other examples of computer-readable instructions include operations for hardening communications, such as those described with respect to FIGS. 1 and 2 and methods 300, 400, and 500. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606) and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). In one aspect, the GPU(s) may be used to perform hardening operations (e.g., translation, encapsulation, etc.) that may be computationally intensive and that may be performed better with higher performance processing units. The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608. In one embodiment, the logic unit(s) 620, the CPU(s) 606, and/or the GPU(s) 608 may be divided into at least one discrete unit for processing communications having outdated protocols. For example, the at least one discrete unit may be separate from other units of the processor(s), which are used to process communications having updated protocols, such that the processing of communications with outdated protocols is isolated.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof.

The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In one embodiment, at least the first device 112, the device A 212, and the device B 214 are client devices. In other embodiments, the second device 114, the device D 226, and the update servers 222 and 224 may be server.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device (e.g., the first device 112, the device A 212, the device B 214, and the device C 216) may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. More-over, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
receiving one or more first network communications sent from a source device to a destination device using a first network communication protocol format;
transmitting, to the destination device, one or more second network communications converted to a second network communication protocol format, the transmitting being based at least on a predefined order for iteratively selecting different formats from a plurality of formats and for iteratively sending the one or more second network communications to the destination device using the different formats until, responsive to the transmitting, a first indication is received that the destination device has received the one or more second network communications converted to the second network communication protocol format;
based at least on the receiving of the first indication, recording in one or more log entries, a second indication that the second network communication protocol format is supported by the destination device;
based at least on the receiving of the one or more first network communications in the first network communication protocol format, selecting the second network communication protocol format based at least on verifying, using the second indication in the one or more log entries, that the second network communication protocol format is supported by the destination device; and
transmitting, to the destination device, the one or more first network communications converted to the second network communication protocol format based at least on the verifying indicating the second network communication protocol format is supported by the destination device.

2. The computer-implemented method of claim 1, wherein the transmitting of the one or more second network communications converted to the second network communication protocol format is based at least on receiving a bounce back responsive to transmitting, to the destination device, the one or more second network communications converted to a third network communication protocol format.

3. The computer-implemented method of claim 1, wherein the first indication includes a response, from the destination device, to the transmitting of the one or more second network communications converted to the second network communication protocol format.

4. The computer-implemented method of claim 1, comprising encapsulating the one or more first network communications having the first network communication protocol format with a wrapper using the second network communication protocol format to convert the one or more first network communications to the second network communication protocol format.

5. The computer-implemented method of claim 1, wherein the different formats correspond to different protocol versions of a same protocol.

6. The computer-implemented method of claim 1, wherein the one or more second network communications are sent from the source device to the destination device.

7. The computer-implemented method of claim 1, wherein the second network communication protocol format corresponds to a newer version of the first network communication protocol format based at least on determining that a third format corresponding to a different network communication protocol than the first network communication protocol format is not supported by the destination device.

8. The computer-implemented method of claim 1, further comprising responsive to the receiving of the one or more first network communications and based at least on determining the one or more first network communications are in the first network communication protocol format, assigning at least one communication channel of the source device to one or more of a: a Virtual Private Network (VPN), a Virtual Local Area Network (VLAN), a subnetwork of an internal network, or a micro-VPN.

9. The computer-implemented method of claim 1, wherein the predefined order corresponds to relative ages of protocols corresponding to the different formats.

10. The computer-implemented method of claim 1, further comprising, based at least on the recording, configuring security rules that specify subsequent communications sent by the source device to the destination device are to be converted to the second network communication protocol format.

11. The computer-implemented method of claim 5, the predefined order corresponds to successively older protocol versions.

12. The computer-implemented method of claim 8, wherein the source device is on a Local Area Network (LAN) with at least one other device, and the assigning of the at least one communication channel isolates the source device from the at least one other device on the LAN.

13. A system comprising:
one or more processing units to perform a method comprising:
receiving one or more first network communications sent from a source device to a destination device using a first network communication protocol format;
transmitting, to the destination device, one or more second network communications converted to a second network communication protocol format, the transmitting being based at least on a predefined order for iteratively selecting different formats from a plurality of formats and for iteratively sending the one or more second network communications to the destination device using the different formats until, responsive to the transmitting, a first indication is received that the destination device has received the one or more second network communications converted to the second network communication protocol format;
based at least on the receiving of the first indication, recording in one or more log entries, a second indication that the second network communication protocol format is supported by the destination device;
based at least on the receiving of the one or more first network communications in the first network communication protocol format, selecting the second network communication protocol format based at least on verifying, using the second indication in the one or more log entries, that the second network communication protocol format is supported by the destination device; and transmitting, to the destination device, the one or more first network communications converted to the second network communication protocol format based at least on the verifying indicating the second network communication protocol format is supported by the destination device.

14. The system of claim 13, wherein the one or more processing units are of a hub, a repeater, a bridge, a switch, a router, a gateway, or a bridge router.

15. The system of claim 13, wherein the one or more processing units and the source device are on a local area network (LAN).

16. The system of claim 13, wherein the verifying is based at least on determining, using one or more test communications transmitted to the destination device in the second network communication protocol format, that a third format is not supported by the destination device.

17. The system of claim 13, further comprising, based at least on the recording, configuring security rules that specify subsequent communications sent by the source device to the destination device are to be converted to the second network communication protocol format.

18. A processor comprising:
one or more circuits to:
receive one or more first network communications sent from a source device to a destination device using a first network communication protocol format;
transmit, to the destination device, one or more second network communications converted to a second network communication protocol format, the transmitting being based at least on a predefined order for iteratively selecting different formats from a plurality of formats and for iteratively sending the one or more second network communications to the destination device using the different formats until, responsive to the transmitting, a first indication is received that the destination device has received the one or more second network communications converted to the second network communication protocol format;
based at least on the receiving of the first indication, record in one or more log entries, a second indication that the second network communication protocol format is supported by the destination device;
based at least on the receiving of the one or more first network communications in the first network communication protocol format, select the second network communication protocol format based at least on verifying, using the second indication in the one or more log entries, that the second network communication protocol format is supported by the destination device; and
transmit, to the destination device, the one or more first network communications converted to the second network communication protocol format based at least on the verifying indicating the second network communication protocol format is supported by the destination device.

19. The processor of claim 18, wherein the one are more circuits associate at least a first identifier (ID) of the first network communication protocol format with a second ID of the second network communication protocol format.

20. The processor of claim 18, wherein the one or more circuits are to, based at least on the one or more first network communications being received in the second network communication protocol format, assign at least one communication channel of the source device to an isolated network.

* * * * *